United States Patent
Kurihara et al.

(10) Patent No.: US 7,020,096 B2
(45) Date of Patent: Mar. 28, 2006

(54) PHYSICAL QUANTITY DISPLAY DEVICE FOR DISPLAYING PHYSICAL QUANTITY OF MULTIPLE SIGNALS, METHOD AND RECORDING MEDIUM

(75) Inventors: Toshiaki Kurihara, Gunma (JP); Satoshi Koizumi, Saitama (JP); Eiji Nishino, Saitama (JP); Hideki Ichikawa, Saitama (JP)

(73) Assignee: Advantest Corporation, Tokyo (JP)

( * ) Notice: Subject to any disclaimer, the term of this patent is extended or adjusted under 35 U.S.C. 154(b) by 865 days.

(21) Appl. No.: 09/923,803

(22) Filed: Aug. 8, 2001

(65) Prior Publication Data

US 2002/0093991 A1 Jul. 18, 2002

(30) Foreign Application Priority Data

Aug. 11, 2000 (JP) .......................... P2000-243848

(51) Int. Cl.
*H04J 1/16* (2006.01)
*H04J 3/14* (2006.01)

(52) U.S. Cl. ........................ 370/252; 370/335; 370/342

(58) Field of Classification Search ................ 370/203, 370/209, 252, 332, 333, 335, 342, 441, 479, 370/235, 241, 320; 375/130, 149, 224, 377; 455/423, 424, 425; 345/98, 100, 440.1
See application file for complete search history.

(56) References Cited

U.S. PATENT DOCUMENTS 5,075,618 A * 12/1991 Katayama ................ 324/76.27
5,239,684 A      8/1993 Ishikura
5,512,916 A *  4/1996 Merchant et al. .............. 345/98
5,563,623 A * 10/1996 Barrett, Jr. .................... 345/98
5,619,524 A *  4/1997 Ling et al. ................... 375/130
5,977,005 A * 11/1999 Mizui .......................... 501/136

(Continued)

FOREIGN PATENT DOCUMENTS

EP      199 55 564 A1    5/2000

(Continued)

OTHER PUBLICATIONS

Bergenheier, R. A. "*Overview of Code-Domain Power, Timing, and Phase Measurements,*" Hewlett-Packard Journal, Hewlett-Packard Co., Palo Alto, US., vol. 47, No. 1, Feb. 1, 1996, pp. 79-93.

Primary Examiner—Ajit Patel
Assistant Examiner—Chirag Shah
(74) Attorney, Agent, or Firm—Lowe Hauptman & Berner, LLP

(57) ABSTRACT

A display device, for displaying values of a physical quantity of multiple channels with different spreading code lengths, includes a channel storage for storing therein both the channels to be displayed and their respective spreading code lengths; a calculating unit for calculating the values of the physical quantity of the channels; a displaying unit for displaying the values of the physical quantity of the channels; and a threshold level comparator for determining a size relationship between the values of the physical quantity and a predetermined threshold level. The displaying unit displays the values of the physical quantity of the channels while changing a display condition in accordance with the size relationship between the values of the physical quantity and the threshold level.

20 Claims, 16 Drawing Sheets

U.S. PATENT DOCUMENTS

| | | |
|---|---|---|
| 6,104,983 A | 8/2000 | Nakada |
| 6,175,560 B1 * | 1/2001 | Bhagalia et al. ............ 370/342 |
| 6,219,340 B1 * | 4/2001 | Cutler et al. ................ 370/241 |
| 6,320,577 B1 * | 11/2001 | Alexander ............... 345/440.1 |
| 6,519,227 B1 * | 2/2003 | Koizumi .................... 370/241 |

FOREIGN PATENT DOCUMENTS

| | | |
|---|---|---|
| GB | 2 338 378 A | 12/1999 |
| JP | 10-173628 | 6/1998 |
| WO | WO 99/12274 | 3/1999 |

* cited by examiner

DISPLAY OBJECT  ~20

| CHANNEL TYPE | SPREADING CODE LENGTH | SPREADING CODE NUMBER |
|---|---|---|
| PICH | 32 | 0 |
| DCCH | 16 | 8 |
| SCH2 | 4 (8) | 2 (6) |
| FCH | 16 | 4 |
| SCH1 | 2 (4) | 1 (2) |

Fig.3

(a) $$\rho_i = \frac{\sum_{j=1}^{N}\left|\sum_{k=1}^{L}Z_{j,k}R_{i,j,k}{}^*\right|^2}{\left\{\sum_{k=1}^{L}|R_{i,j,k}|^2\right\}\left\{\sum_{j=1}^{N}\sum_{k=1}^{L}|Z_{j,k}|^2\right\}}$$

(b) $W_i = 10.0 \times \log_{10}\rho_i$ [dB]

(c) $X_i$[dBm] = POWER VALUE OF INPUT SIGNAL [dBm] + $W_i$ [dB]

Fig.4

| CHANNEL TYPE | POWER [dB] |
|---|---|
| PICH | −3 |
| DCCH | −6 |
| SCH2 | −40 |
| FCH | −6.5 |
| SCH1 | −30 |

Fig.5

(a) 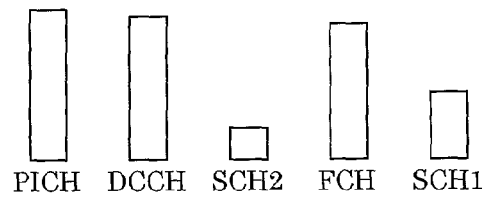
(b) 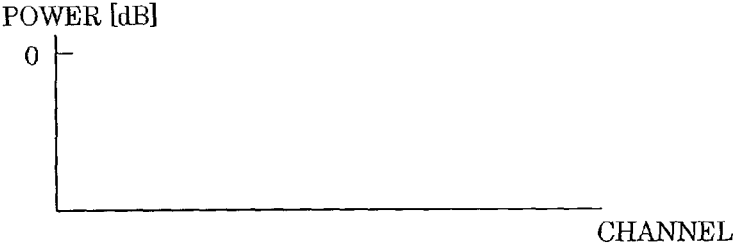
(c) 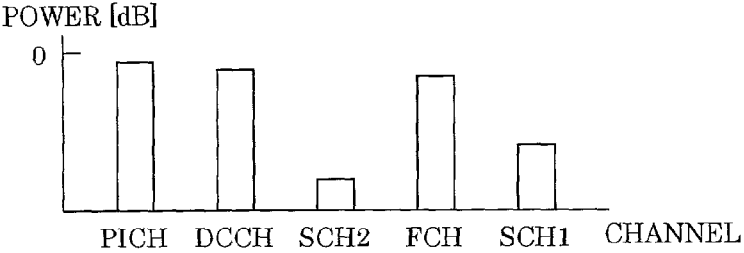
Fig.6

(a) $EVM_{ij} = 100 \times \sqrt{\dfrac{\left|\left(\sum_{k=1}^{L} Z_{j,k}\cdot R_{i,j,k}{}^{*}\right) - \left(\sum_{k=1}^{L} R_{i,j,k}\cdot R_{i,j,k}{}^{*}\right)\right|^{2}}{\left|\left(\sum_{k=1}^{L} R_{i,j,k}\cdot R_{i,j,k}{}^{*}\right)\right|^{2}}}$ [%]

(b) Phase Error ij $= \mathrm{Arg}\left(\sum_{k=1}^{L} Z_{j,k}\cdot R_{i,j,k}{}^{*}\right) - \mathrm{Arg}\left(\sum_{k=1}^{L} R_{i,j,k}\cdot R_{i,j,k}{}^{*}\right)$ [degree] OR [radian]

PROVIDED THAT Arg IS $\tan^{-1}\dfrac{\beta}{\alpha}$ WHEN WITHIN ( ) IS TAKEN TO BE $\alpha + j\beta$.

(c) Magnitude Error ij $= 100 \times \dfrac{\left|\sum_{k=1}^{L} Z_{j,k}\cdot R_{i,j,k}{}^{*}\right| - \left|\sum_{k=1}^{L} R_{i,j,k}\cdot R_{i,j,k}{}^{*}\right|}{\left|\sum_{k=1}^{L} R_{i,j,k}\cdot R_{i,j,k}{}^{*}\right|}$ [%]

Fig.9

LENGTH OF WALSH FUNCTION L=4

| CHANNEL(i) | WALSH CODE | | | |
|---|---|---|---|---|
| 0 | 0 | 0 | 0 | 0 |
| 1 | 0 | 1 | 0 | 1 |
| 2 | 0 | 0 | 1 | 1 |
| 3 | 0 | 1 | 1 | 0 |

Fig.15

PHYSICAL QUANTITY DISPLAY DEVICE FOR DISPLAYING PHYSICAL QUANTITY OF MULTIPLE SIGNALS, METHOD AND RECORDING MEDIUM

BACKGROUND OF THE INVENTION

1. Field of Invention

The present invention relates to indications of physical quantity displayed by the physical quantity display device that displays physical quantity of multiple signals that are the results of code-domain analysis of signals through being subjected to coded multiplexing by use of Walsh Function.

2. Description of the Related Art

Under control of the CDMA (Code Division Multiple Access) system, in some cases, signals are subjected to coded multiplexing using the Walsh Function. The Walsh Function has length of $2^n$ (n is positive integers).

FIG. 15 illustrates an example of the Walsh Function in the case of n=2. In this case, length of the Walsh Function is $2^2=4$, accordingly, it is possible to transmit signals of 4ch (channel) from 0 to 3.

Signals that are coded by use of the Walsh Function are received, before being subjected to converse coding. At the time that the signals are received, signals of the number of channels corresponding to length of the Walsh Function become possible to be received. For instance, in the case of n=6, signals of $2^6=64$ channels can be received.

Also, as illustrated in FIG. 16, it is possible to display power of the signals in every channel on a display. In FIG. 16, length of the Walsh Function is 64, in which powers of the channels from 0 to 63 are illustrated. This power is decided as Code Domain Power. Before allowing the Code Domain Power to be displayed on the screen, the Code Domain Powers of all channels of the Walsh Function are displayed while fixing length of the Walsh Function.

Further, when the Code Domain Power is displayed, power (Estimated ρ) and so forth are calculated, and result of these calculations might be displayed at part of display area of the Code Domain Power. The power (Estimated ρ) is the sum of the powers whose values exceed the Threshold Level from among the respective channels of power. FIG. 16 illustrates "ρ=0.99" which corresponds to this matter.

Furthermore, recent CDMA standard such as cdma 2000, contains one in which length of the Walsh Function is capable of being switched. Here, there is a case that certain Code Domain Power is intended to be displayed, namely, certain specific channel (example, PICH (Pilot Channel) (length: 32, 0 ch), DCCH (Dedicated Control Channel) (length: 16, 8 ch)) of the Walsh Function with different length are intended to be displayed.

SUMMARY OF INVENTION

However, for instance as the conventional technique, PICH and DCCH cannot be displayed simultaneously, when the length of the Walsh Function is fixed before the powers of the whole channels are displayed. Namely, it is impossible to display certain particular channels of the Walsh Function with respective different lengths at the same time.

Moreover, since calculation result of the power (Estimated ρ) is displayed at part of display area of the Code Domain Power, only a small amount of information quantity except for the Code Domain Power can be displayed.

Furthermore, although it is important that which channel of power exceeds the Threshold Level among the respective channels of the power in such calculation of the power (Estimated ρ), there is incomprehensible case that it is difficult to know which channel of power exceeds the Threshold Level. Particularly, in the case that the channel of power is close to the Threshold Level, it is considerably incomprehensible case.

The present invention has been made in consideration of the above-mentioned circumstances, and an object of the present invention is to provide devices and so forth making it possible to simplify indications to display such Code Domain Power and data pertinent to the Code Domain Power.

According to an aspect of the present invention, a physical quantity display device for displaying physical quantity of multiple signals in every predetermined channel while demodulating signals onto which channels with different spreading code lengths are multiplexed, includes: a channel storage unit for storing therein both display object channels to be displayed and the spreading code length of the display object channels; a physical quantity calculation unit far calculating physical quantity of the display object channels; and a physical quantity display unit for displaying the physical quantity of the display object channels.

According to the physical quantity display device for displaying physical quantity of multiple signals constituted in such a way as to be described above, it is possible to display the physical quantity about the display object channels stored in the channel storage unit. The physical quantity display device is capable of displaying the display object channels with different spreading code lengths simultaneously because coexistence of different spreading code lengths of the display object channels are allowed.

According to an aspect of the present invention, Walsh Function is used as the spreading code, and length of the Walsh Function is the spreading code length.

According to an aspect of the present invention, the physical quantity display unit displays physical quantity of the display object channels while arranging the display object channels in turn on the same axis.

According to an aspect of the present invention, the physical quantity display unit displays physical quantity while adding inherent designation to the display object channels.

According to an aspect of the present invention, the physical quantity is quantity derived from the power.

According to an aspect of the present invention, the physical quantity display device further includes: a channel selection unit for selecting any one of the display object channels; and a different kind physical quantity display unit for displaying different kind physical quantity, which is different kind from the physical quantity, of the selected display object channel at different area within a screen on which the physical quantity of the display object channels is displayed.

According to the physical quantity display device for displaying physical quantity of multiple signals constituted in such a way as to be described above, it is possible to display certain physical quantity about the display object channels. Moreover, it is possible to display also different kind physical quantity of selected channel within the display object channels. Furthermore, since display area of the physical quantity is different from display area of the different kind physical quantity, the display area of the different kind physical quantity can be secured broadly.

According to an aspect of the present invention, the physical quantity is quantity derived front the power, and the different kind physical quantity is either an error or demodulation data.

According to an aspect of the present invention, the physical quantity display device further includes a Threshold Level comparison unit for judging size relationship between the physical quantity and predetermined Threshold Level, wherein the physical quantity display unit displays the physical quantity of the display object channels while changing display condition in accordance with the size relationship between the physical quantity and the Threshold Level.

Since the physical quantity display unit displays the physical quantity of the display object channels while changing display condition in accordance with the size relationship between the physical quantity and the Threshold Level, it is easily recognized whether the physical quantity of which channel is greater than the Threshold Level.

According to an aspect of the present invention, a physical quantity display method for displaying physical quantity of multiple signals in every predetermined channel while demodulating signals onto which channels with different spreading code lengths are multiplexed, includes: a channel storage step for storing therein both display object channels to be displayed and the spreading code length of the display object channels; a physical quantity calculation step for calculating physical quantity of the display object channels; and a physical quantity display step for displaying the physical quantity of the display object channels.

According to an aspect of the present invention, provided is a computer-readable medium having a program of instructions for execution by the computer to perform a physical quantity display process for displaying physical quantity of multiple signals in every predetermined channel while demodulating signals onto which channels with different spreading code lengths are multiplexed, the physical quantity display process including: a channel storage processing for storing therein both display object channels to be displayed and the spreading code length of the display object channels; a physical quantity calculation processing for calculating physical quantity of the display object channels; and a physical quantity display processing for displaying the physical quantity of the display object channels.

BRIEF DESCRIPTION OF THE DRAWINGS

FIG. 3 is a view illustrating storage contents of the channel storage section 20;

FIG. 4 shows equations indicating finding method of power coefficient $\rho i$ (FIG. 4($a$)), power Wi[dB] (FIG. 4($b$)), and absolute value of the power Xi[dBm] (FIG. 4($c$));

FIG. 5 is a view illustrating one example of calculated result of the power calculation section 30;

FIG. 6 shows views illustrating display data of calculated result in every respective channel (FIG. 6($a$)), display data of a background (FIG. 6($b$)), synthesis result of those display data (FIG. 6($c$));

FIG. 9 shows equations for indicating finding method of EVM ij (FIG. 9($a$)), Phase Error ij (FIG. 9($b$)), and Magnitude Error ij (FIG. 9($c$));

FIG. 15 is a view illustrating an example of the Walsh Function in the case of n=2 in the conventional art.

DESCRIPTION OF THE PREFERRED EMBODIMENTS

The embodiments of the present invention will be described in detail below referring to accompanying drawings.

First Embodiment

Figure 1:
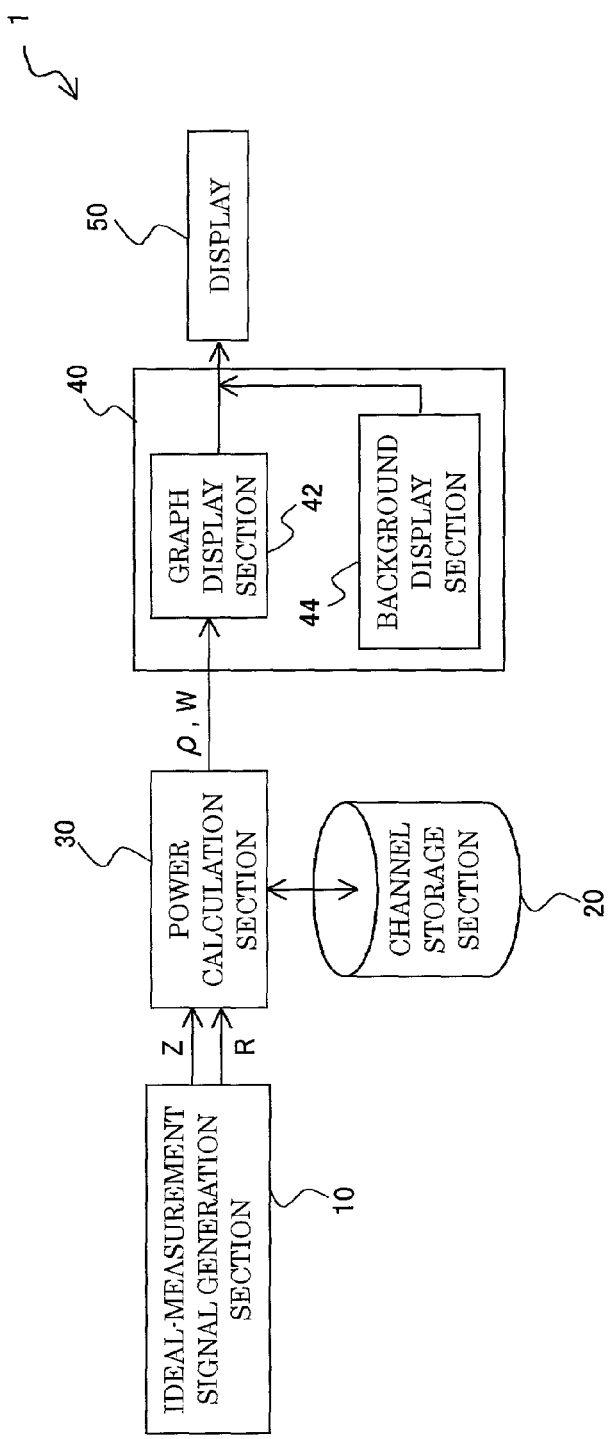
FIG. 1 is a block diagram illustrating a configuration of the physical quantity display device 1 for displaying physical quantity of the multiple signals according to the first embodiment of the present invention.

FIG. 1 is a block diagram illustrating a configuration of a physical quantity display device 1 for displaying physical quantity of multiple signals according to a first embodiment of the present invention. The physical quantity display device 1 for displaying physical quantity of the multiple signals according to the first embodiment of the present invention is provided with an ideal-measurement signal generation section 10, a channel storage section 20, a power calculation section 30, a power display section 40, and a display 50.

The ideal-measurement signal generation section 10, under control of the CDMA (Code Division Multiple Access) system, generates ideal signals R and measurement signals Z while receiving signals through being subjected to coded multiplexing by use of the Walsh Function. Generation of the ideal signals R and the measurement signals Z are well known technique, and also, it is described in, for instance, the official gazette of the Japanese Patent Application Laid-Open No. HEI 10-173628.

Figure 2:
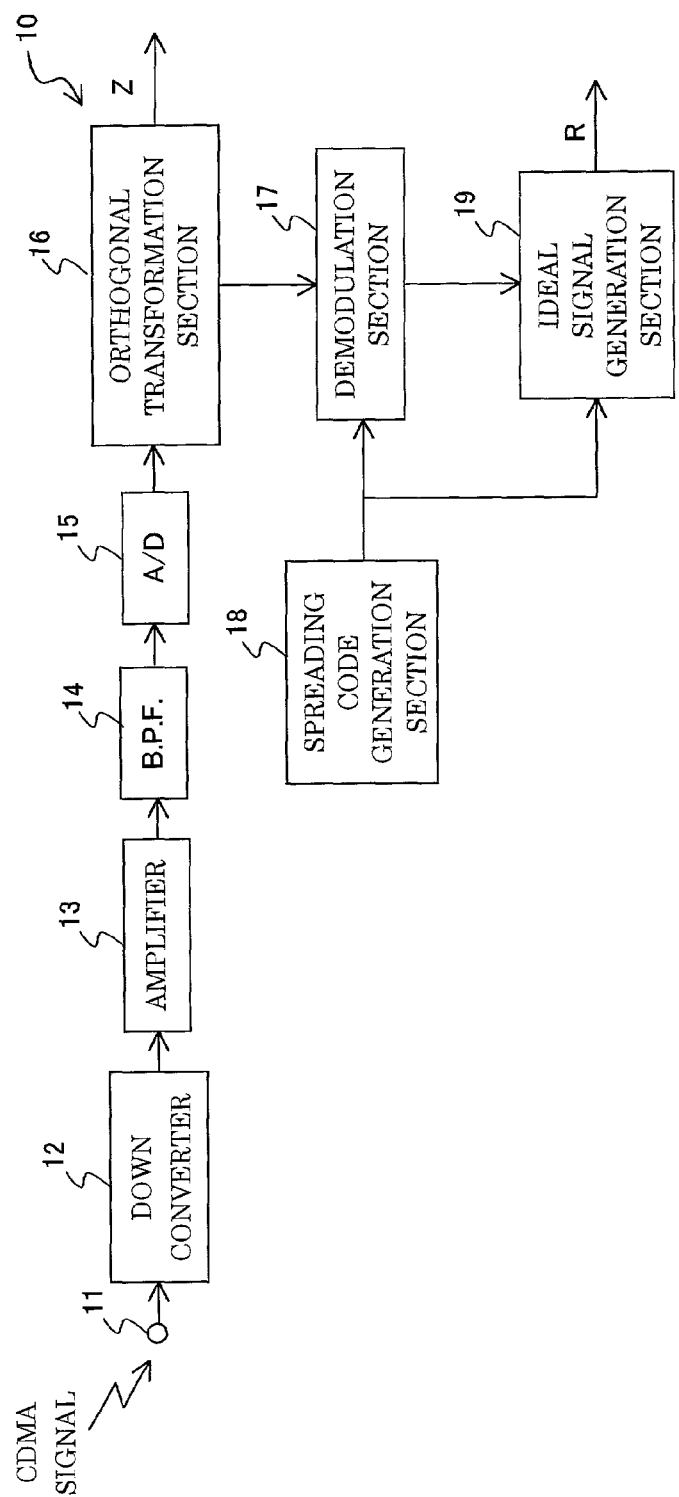
FIG. 2 is a block diagram illustrating a configuration of an ideal-measurement signal generation section 10.

Accordingly, only outline of the ideal-measurement signal generation section 10 will be described. FIG. 2 illustrates the ideal-measurement signal generation section 10. The ideal-measurement signal generation section 10 has an input terminal 11, a down converter 12, an amplifier 13, a band pass filter 14, an A/D converter 15, an orthogonal transformation section 16, a demodulation section 17, a spreading code generation section 18, and an ideal signal generation section 19.

The input terminal 11 inputs therein CDMA signals of multi-channel through being subjected to frequency spreading from a mobile station that is not illustrated. The down converter 12 converts the CDMA signals input to the input terminal 11 into intermediate frequency signals. The amplifier 13 amplifies the output signals of the down converter 12. The band pass filter 14 applies band limitation to the output signals of the amplifier 13. The A/D converter 15 converts analog output signals of the band pass filter 14 into digital signals. The orthogonal transformation section 16 converts the output signals of the A/D converter 15 into baseband signals Z to output. The baseband signals Z are also called as measurement signals. The demodulation section 17 receives the spreading code (Walsh Function) from the spreading code generation section 18, despreads the measurement signal Z, and outputs bit data and amplitude in every respective channels. The spreading code generation section 18 generates the spreading code (Walsh Function) to supply to the demodulation section 17 and the ideal signal generation section 19. The ideal signal generation section 19 generates to be output the ideal signal R from the bit data, the amplitude and spreading code in every respective channels.

Moreover, in the device described in the Japanese Patent Application Laid-Open No. HEI 10-173628, although additional function is added to the device to plan optimization of the signal, however, in principle, only above-described constitution is capable of generating to be output the measurement signal Z and the ideal signal R.

The channel storage section 20 stores therein display object channels that are the objects to display the power on the display 50. As illustrated in FIG. 3, the channel storage section 20 stores therein channel type, spreading code length (Walsh Function length), and spreading code number (Walsh Function number). The spreading code length is length of the Walsh Function in the case that the Walsh Function is used for coding.

Moreover, the channel type is inherent designation that is given to combination between the spreading code length (Walsh Function length) and the spreading code number (Walsh Function number). In one example illustrated in FIG. 3, the channel type PICH (Pilot Channel) means 0-th channel of the spreading code length 32. As another cases, the channel type DCCH (Dedicated Control Channel) means 8-th channel of the spreading code length 16, the channel type SCH2 (Supplemental Channel 2) means second channel of the spreading code length 4 (or 6-th channel of the spreading code length 8), the channel type FCH (Fundamental Channel) means 4-th channel of the spreading code length 16, the channel type SCH1 (Supplemental Channel 1) means first channel of the spreading code length 2 (or second channel of the spreading code length 4). However, the channel type SCH1 and the channel type SCH2 are never the second channel of the spreading code length 4 at the same time. For instance, in such a case, if the channel type SCH2 is the second channel of the spreading code length 4, the channel type SCH 1 becomes the first channel of the spreading code length 2.

When identifying the channel to observe by use of the spreading code number, such as the Code Domain Power graph, even though the same channel type is measured, since a position displayed on the graph is changed with change of the spreading code number, it is inconvenient for the user. However, when identifying individual display object channel by use of inherent designation (channel type), even though the spreading code number to be observed is changed, it is possible to observe as the same graph on the graph display.

Thus, it is the characteristic that the display object channels stored in the channel storage section 20 have different spreading code length.

The power calculation section 30 calculates power coefficient $\rho i$, power Wi[dB], absolute value of power Xi[dBm] in every channel of the display object channels stored in the channel storage section 20. The power coefficient $\rho i$, power Wi[dB], absolute value of power Xi[dBm] can be calculated in such a way as illustrated in respective FIG. 4(a), FIG. 4(b), and FIG. 4(c). Provided that, L is length of the Walsh Function, namely, L is spreading code length, i is spreading code number, and N is a value in which measurement range is expressed by the number of symbol. The number of symbol is a value in which the measurement range [chip] is divided by length [chip] of the Walsh Function. Furthermore, it can be stated that the whole quantity described above is quantity derived from the power. FIG. 5 illustrates one example of calculation result of the power calculation section 30. The power is calculated in every respective channels. Moreover, in the first embodiment, the power calculation section 30 is described as means for calculating quantity pertinent to the power, however, if another means can calculate physical quantity in every respective channels, the another means can be replaced in stead of the power calculation section 30.

The power display section 40 displays calculation result of the power calculation section 30 on the display 50. The power display section 40 has a graph display section 42 and a background display section 44. The graph display section 42, as illustrated in FIG. 6(a), generates display data of calculation result in every respective channels. The background display section 44, as illustrated in FIG. 6(b), generates display data such as longitudinal axis, horizontal axis, and designation of each axis that are not changed depending on the calculation result as unchanged background. The power display section 40, as illustrated in FIG. 6(c), synthesizes data generated by the graph display section 42 and the background display section 44 to display on the display 50. As illustrated in FIG. 6(c), the calculation result of the power calculation section 30 displayed on the display 50 is a bar graph in which the display object channels are arranged on the same horizontal axis, and the power is expressed by the longitudinal axis. Moreover, for instance CRT (Cathode Ray Tube) is utilized as the display 50.

Figure 7:
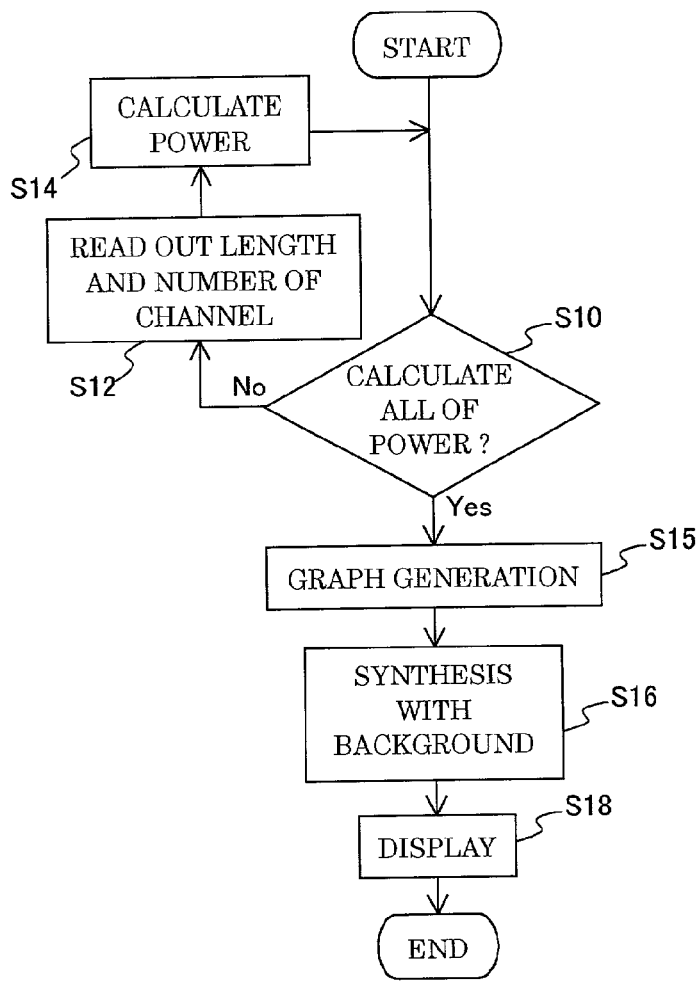
FIG. 7 is a flowchart illustrating operations of the physical quantity display device 1 for displaying physical quantity of the multiple signals according to the first embodiment of the present invention.

Next, operations of the physical quantity display device 1 for displaying physical quantity of the multiple signals according to the first embodiment of the present invention will be described referring to flowchart of FIG. 7.

Firstly, when the CDMA signals of multi-channel through being subjected to frequency spreading are input to the input terminal 11 (referring to FIG. 2) from the mobile station, the CDMA signals input to the input terminal 11 are converted into intermediate frequency signals by the down converter 12, then the intermediate frequency signals are amplified by the amplifier 13. Further, the amplified intermediate frequency signals are subjected to band limitation by the band pass filter 14 and then the amplified intermediate frequency signals are converted into digital signals by the A/D converter 15. The intermediate frequency signals converted into the digital signals are converted into the measurement signal Z by the orthogonal transformation section 16 to be output. Furthermore, the measurement signal Z becomes the bit data and the amplitude in every respective channels through being subjected to despreading depending on the demodulation section 17 on the basis of the spreading code (Walsh Function) which is supplied from the spreading code generation section 18. The ideal signal generation section 19 generates to output the ideal signal R from the bit data, the amplitude and spreading code in every respective channels.

Accordingly, returning to FIG. 7, judgment is made to execute whether the power calculation section 30 has calculated the power about all of the display object channels stored in the channel storage section 20 (S10). If there exists the display object channel whose power is not calculated yet (S10, No), the power calculation section 30 reads out the spreading code length and the spreading code number from the channel storage section 20 (S12). Further, the power calculation section 30 calculates power of the read out spreading code length and spreading code number (S14). Then, returning to the judgment whether the power has calculated about all of the display object channels (S10).

If calculation of the power about all of the display object channels is terminated (S10, Yes), the graph display section 42 generates a graph on the basis of calculated value of the power (S15). Further, synthesis is performed between the graph generated by the graph display section 42 and the background generated by the background display section 44 (S16), before displaying on the display 50 (S18) (referring to FIG. 6(c)).

According to the first embodiment, it is possible to display the physical quantity such as power and so forth about the display object channels (PICH and so forth) stored in the channel storage section 20. Further, as illustrated in FIG. 3, since different spreading code length (Walsh Function length) of the display object channels can be tolerated, it is possible to allow the display object channel of different spreading code length to be displayed simultaneously on the display 50. For instance, although the spreading code length 32 of PICH differs from the spreading code length 16 of DCCH, those powers and so forth can be displayed simultaneously as illustrated in FIG. 6(c).

Second Embodiment

The second embodiment is different from the first embodiment in that the second embodiment is capable of displaying error and so forth about the channel selected from among the display object channels except for the power of the display object channels in comparison with the first embodiment.

Figure 8:
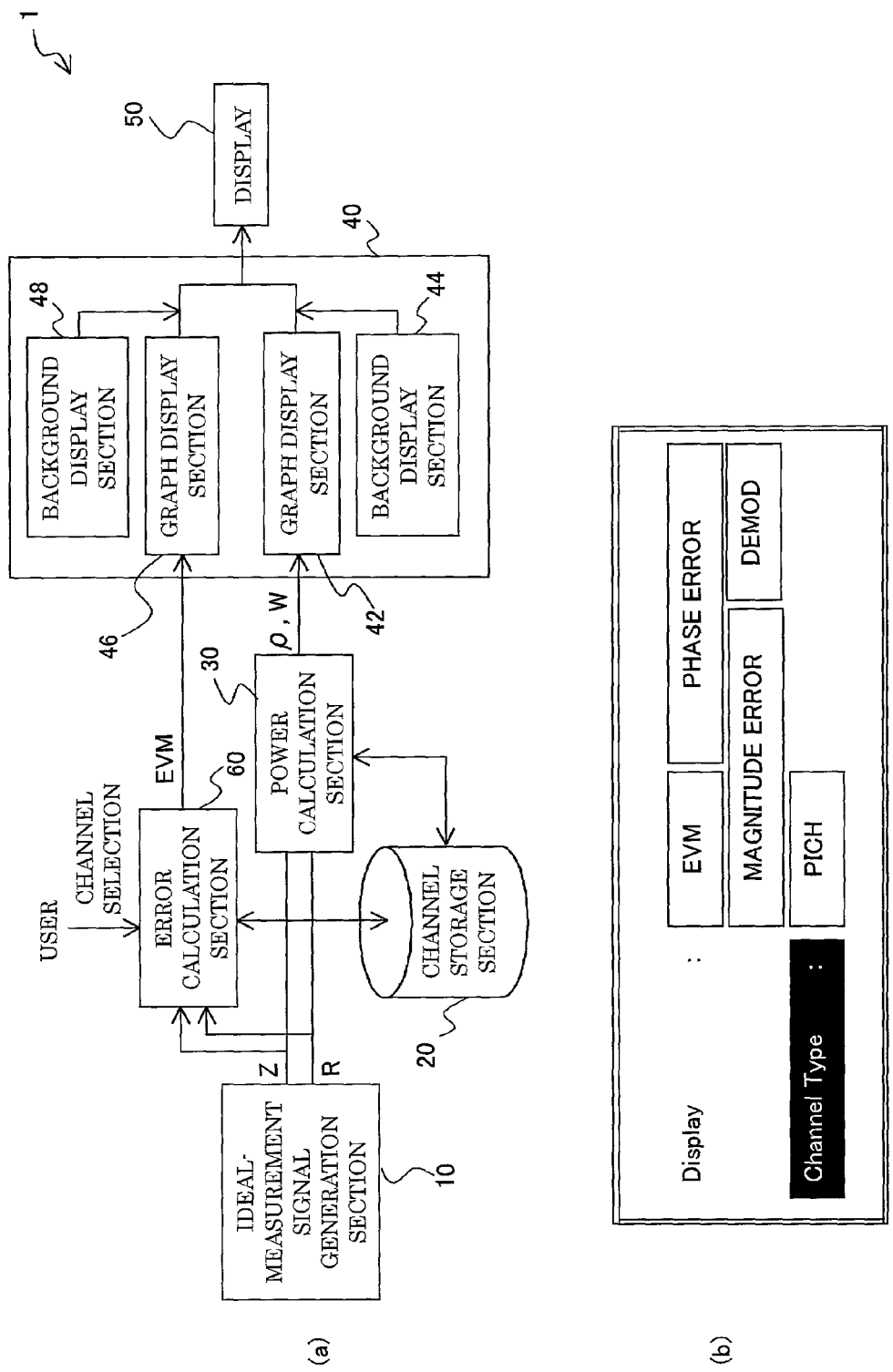
FIG. 8 is a block diagram illustrating a configuration of the physical quantity display device 1 for displaying physical quantity of the multiple signals according to the second embodiment of the present invention.

FIG. 8(a) is a block diagram illustrating a configuration of the physical quantity display device 1 for displaying physical quantity of the multiple signals according to the second embodiment of the present invention. Hereinafter, the same number is added to the same part as that of the first embodiment to omit explanation.

An error calculation section 60 calculates EVM ij (Error Vector Magnitude) [%], Phase Error ij [degree] or [radian], Magnitude Error ij [%] in every symbol of channel selected by the user and so forth from among the display object channels stored in the channel storage section 20. Provided that i is the spreading code number indicating specified channel, and j (to be a value, any one of 1 to N) indicates a symbol number. Each EVM ij, Phase Error ij, Magnitude Error ij is calculated by use of equations illustrated in FIG. 9(a), FIG. 9(b), and FIG. 9(c). It can be stated that these quantities are different kind of quantities derived from the power, namely, these quantities are related to errors. Moreover, in the second embodiment, the error calculation section 60 is described as means for calculating quantity pertinent to the error, however, if another means can calculate different kind of quantity from the quantity derived from the power in every respective channels, the another means can be replaced in stead of the error calculation section 60. For instance, it is suitable that the error calculation section 60 may be replaced by the means for calculating demodulation data. Furthermore, with respect to selection of the channels, key is made to prepare, as illustrated in FIG. 8(b), it is suitable that selection is executed by pressing such key.

The power display section 40 displays calculation result of the power calculation section 30 and calculation result of the error calculation section 60 on the display 50. The power display section 40 has graph display sections 42, 46 and background display sections 44, 48. The graph display section 42 and the background display section 44 are the same as those of the first embodiment, and display data generated by the graph display section 42 and the background display section 44 are synthesized, thus resulting in FIG. 10(a).

Figure 10:
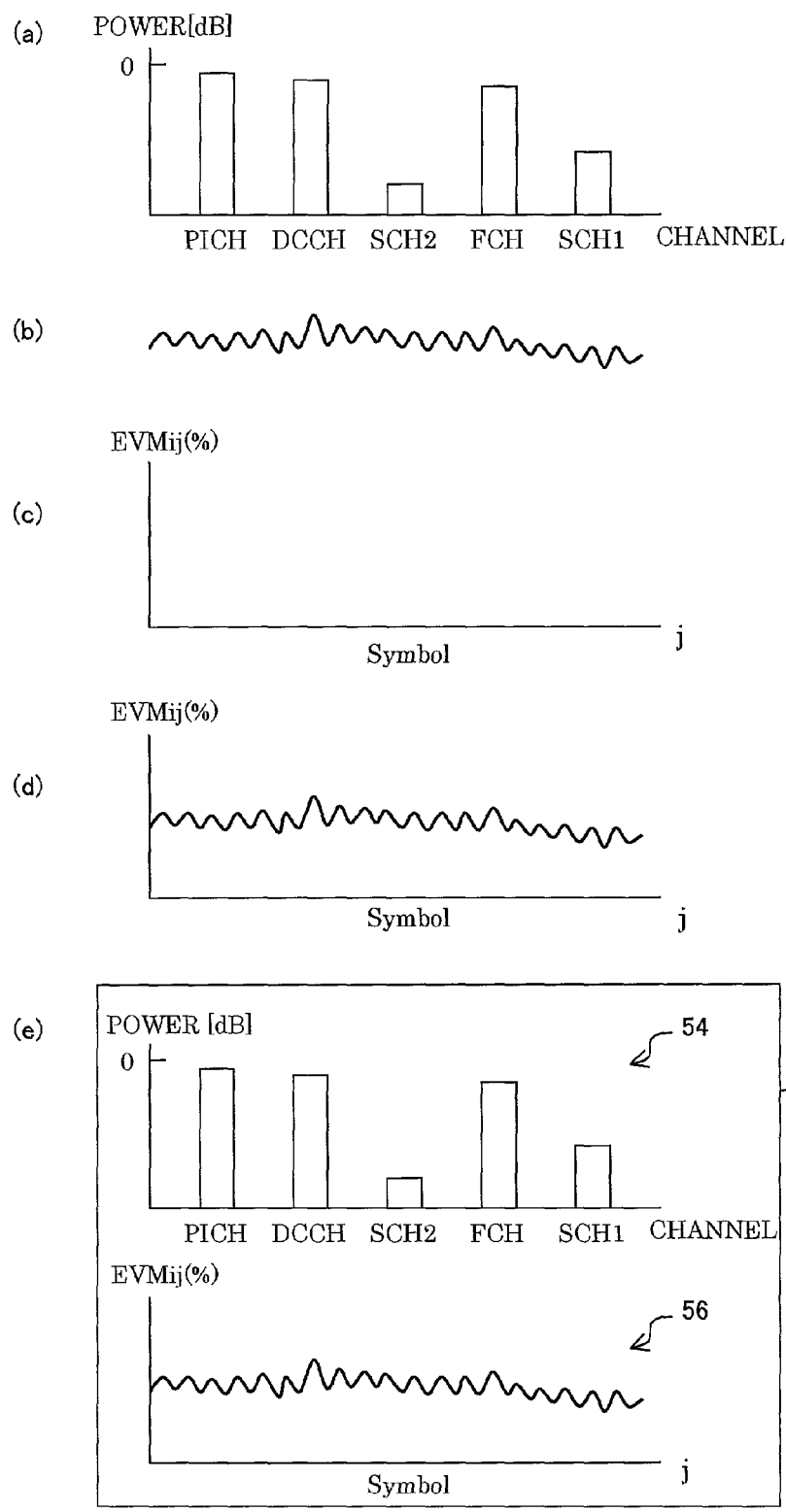
FIG. 10 shows views illustrating synthesis result of power calculated result and the background in every respective channel (FIG. 10($a$)), display data of EVM ij calculated result of selected channel (FIG. 10($b$)), display data of the background (FIG. 10($c$)), synthesized result of those display data (FIG. 10($d$)), and synthesized result of power display and EVM ij display (FIG. 10($e$))

The graph display section 46, as illustrated in FIG. 10(b), generates display data such as EVM ij and so forth of the selected channel in the error calculation section 60 among the display object channels. The background display section 48, as illustrated in FIG. 10(c), generates display data such as longitudinal axis, horizontal axis, and designation of each axis that are not changed depending on the calculation result as unchanged background. Data generated by the graph display section 46 and the background display section 48 are synthesized, thus resulting in FIG. 10(d).

The power display section 40 synthesizes display data generated by the graph display sections 42, 46 and the background display sections 44, 48 to display on the display 50. Namely, as illustrated in FIG. 10(e), the power display section 40 arranges display data (referring to FIG. 10(a)) generated by the graph display section 42 and the background display section 44 to the first area 54 of a screen 52 on the display 50 and display data (referring to FIG. 10(d)) generated by the graph display section 46 and the background display section 48 to the second area 56 of the screen 52 on the display 50.

Figure 11:
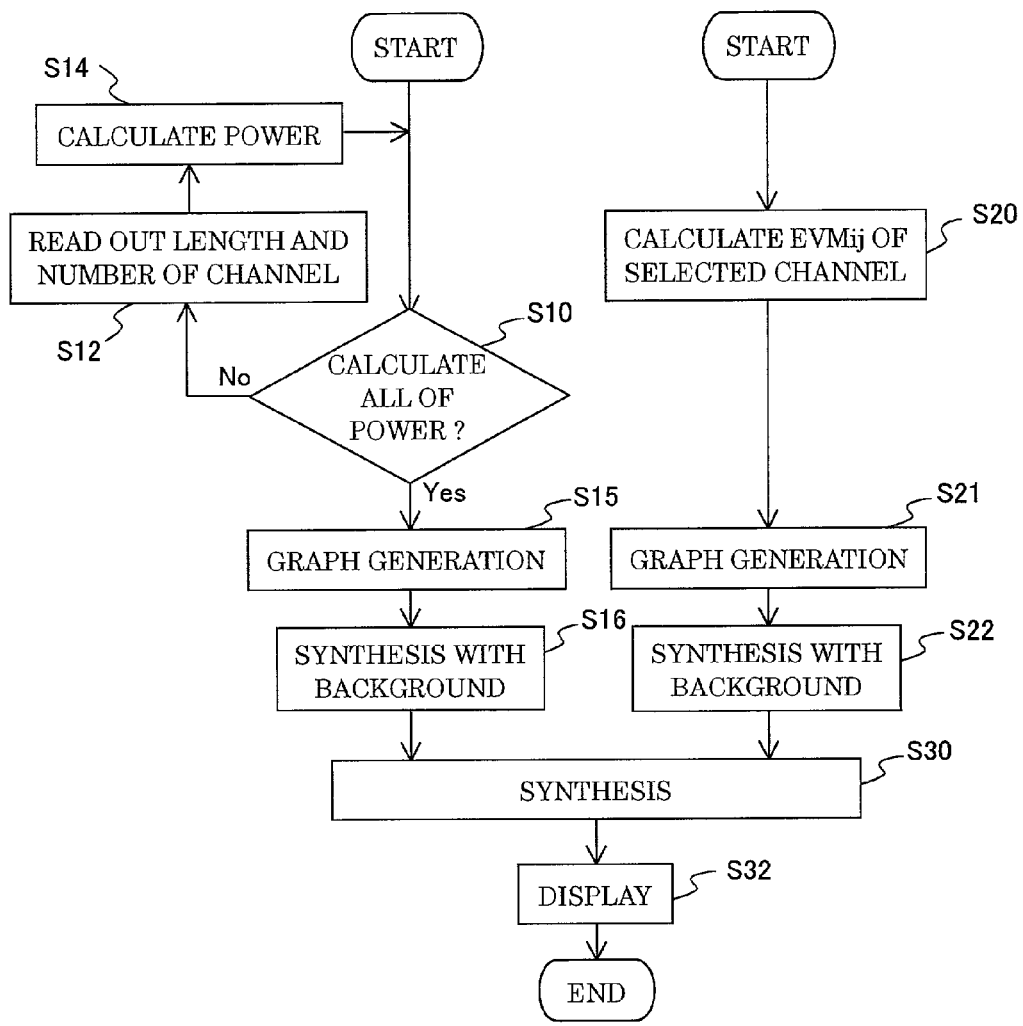
FIG. 11 is a flowchart illustrating operation of the physical quantity display device 1 for displaying physical quantity of the multiple signals according to the second embodiment of the present invention.

Next, operations of the physical quantity display device 1 for displaying physical quantity of the multiple signals according to the second embodiment of the present invention will be described referring to flowchart of FIG. 11.

Firstly, when the CDMA signals of multi-channel through being subjected to frequency spreading are input to the input terminal 11 (referring to FIG. 2) from the mobile station, the CDMA signals input to the input terminal 11 are converted into intermediate frequency signals by the down converter 12, then the intermediate frequency signals are amplified by the amplifier 13. Further, the amplified intermediate frequency signals are subjected to band limitation by the band pass filter 14 and then the amplified intermediate frequency signals are converted into digital signals by the A/D converter 15. The intermediate frequency signals converted into the digital signals are converted into the measurement signal Z by the orthogonal transformation section 16 to be output. Furthermore, the measurement signal Z becomes the bit data and the amplitude in every respective channels through being subjected to despreading depending on the demodulation section 17 on the basis of the spreading code (Walsh Function) which is supplied from the spreading code generation section 18. The ideal signal generation section 19 generates to output the ideal signal R from the bit data, the amplitude and spreading code in every respective channels.

Accordingly, returning to FIG. 11, judgment is made to execute whether the power calculation section 30 has calculated the power about all of the display object channels stored in the channel storage section 20 (S10). If there exists the display object channel whose power is not calculated yet (S10, No), the power calculation section 30 reads out the spreading code length and the spreading code number from the channel storage section 20 (S12). Further, the power calculation section 30 calculates power of the read out spreading code length and spreading code number (S14). Then, returning to the judgment whether the power has calculated about all of the display object channels (S10).

If calculation of the power about all of the display object channels is terminated (S10, Yes), the graph display section 42 generates a graph on the basis of calculated value of the power (S15). Further, synthesis is performed between the graph generated by the graph display section 42 and the background generated by the background display section 44 (S16) (referring to FIG. 10(a)).

Moreover, calculation of EVM ij and so forth (Phase Error ij, Magnitude Error ij, demodulation data is also good) (S20), graph generation (S21) and synthesis of background and the graph therebetween (S22) are performed in parallel with calculation of the power (S10 to S14), graph generation (S15) and synthesis of background and the graph therebetween (S16).

Namely, the error calculation section 60 calculates EVM and so forth of the channel selected among the display object channels (S20). The graph display section 46 generates a graph on the basis of calculated values such as EVM ij and so forth (S21). Then, the graph generated by the graph display section 46 and the background generated by the background display section 48 are synthesized (S22) (referring to FIG. 10(d)).

The power display section 40 synthesizes display data generated by the graph display sections 42, 46, and the background display sections 44, 48 (S30), to display on the display 50 (referring to FIG. 10(e)).

According to the second embodiment, it is possible to display the power concerning the display object channels. Furthermore, also EVM ij of the channel selected from among the display object channels is capable of being displayed. Moreover, since display area of the power differs from display area of the EVM ij, the second area 56 to be display area of the EVM ij is secured broadly.

When specifying channel of measurement object using the spreading code number or the spreading code length, the channel deviates from the measurement object as the spreading code number or the spreading code length is changed on halfway of measurement. However, even though the spreading code number or the spreading code length is changed on halfway of measurement, it becomes possible to measure the channel while following the channel as measurement object channel by identifying the measurement object channel while using inherent designation (channel type).

The power is capable of being displayed by use of one bar graph in each channel. However, EVM ij, Phase Error ij, and Magnitude Error ij cannot be displayed unless horizontal axis does increase the length. Further, it is necessary to secure broad place in order to display the demodulation data. Accordingly, it is difficult to display plurality of channels simultaneously in connection with those EVM ij, Phase Error ij, Magnitude Error ij and demodulation data. It is preferable to display only one channel in connection with those data.

According to the second embodiment, in cases where the data of a plurality of channels can be displayed simultaneously such as the power, the data of a plurality of channels are displayed simultaneously by use of the bar graph, while in cases where the data is preferably displayed about only one channel such as the EVM ij and so forth, the data is displayed in connection with its only one channel. Thus, since it is possible to distinguish display form, further, it is possible to display the power and the EVM ij simultaneously, the user can read various data simultaneously, thus it is convenience for the user.

Third Embodiment

The third embodiment differs from the first embodiment in that the third embodiment displays whether the power and so forth exceed predetermined value (Threshold Level) among the display object channels by use of color identification in comparison with the first embodiment.

Figure 12:
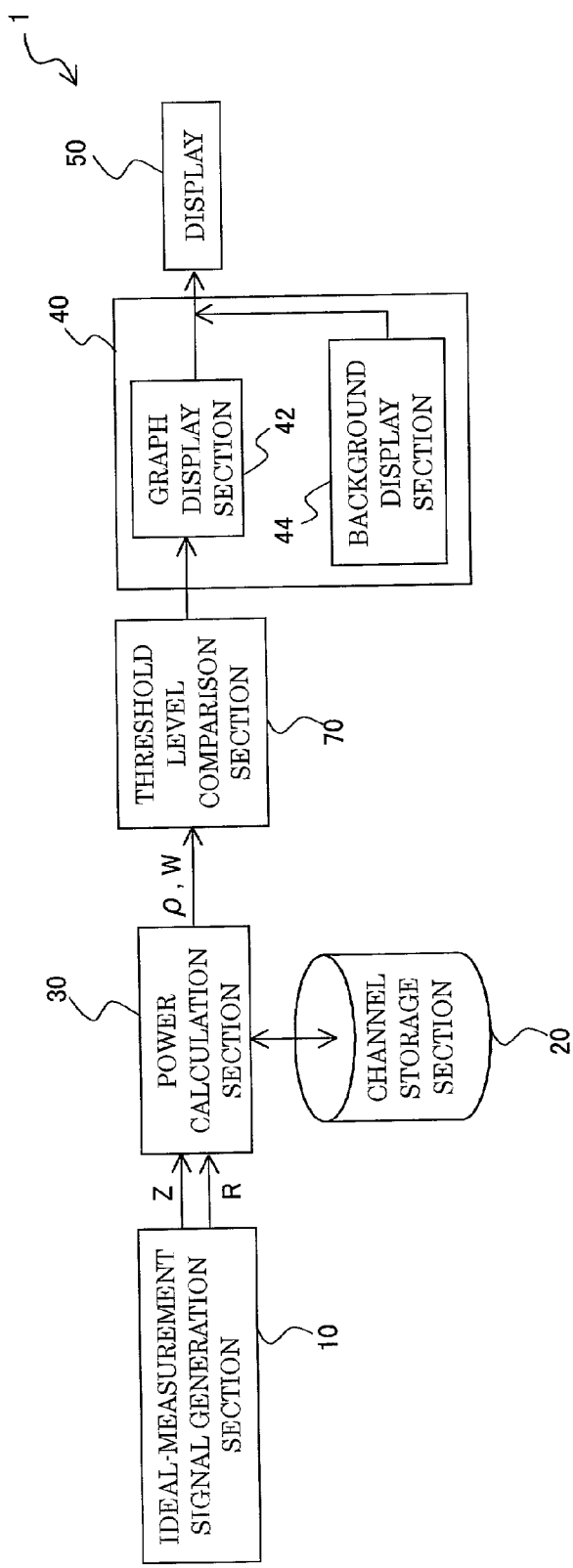
FIG. 12 is a block diagram illustrating a configuration of the physical quantity display device 1 for displaying physical quantity of the multiple signals according to the third embodiment of the present invention.

FIG. 12 is a block diagram illustrating a configuration of the physical quantity display device 1 for displaying physical quantity of the multiple signals according to the third embodiment of the present invention. Hereinafter, the same number is added to the same part as that of the first embodiment to omit the explanation.

Figure 13:
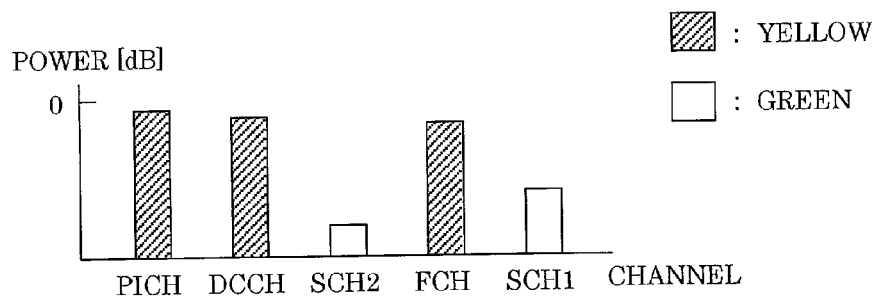
FIG. 13 is a display screen of power calculated result.

The Threshold Level comparison section 70 judges whether the power and so forth calculated by the power calculation section 30 exceed the Threshold Level. The Threshold Level comparison section 70 sends the judgment result to the graph display section 42. The graph display section 42 generates a graph of yellow color about the channel exceeding the Threshold Level, while the graph display section generates a graph of green color about the channel not exceeding the Threshold Level. If the power calculated by the power calculation section 30 is the same as that of the first embodiment (FIG. 5), and the Threshold Level is −20 [dB], as illustrated in FIG. 13, PICH, DCCH, and FCH are displayed as bar graph of yellow color, and SCH2, and SCH1 are displayed as bar graph of green color on the display 50.

Moreover, also, the graph display section 42 preferably changes display condition of the channel exceeding the Threshold Level from display condition of the channel not exceeding the Threshold Level except for color identification, concretely, for instance, hatching is given to the channel exceeding the Threshold Level, or hatching is given to the channel not exceeding the Threshold Level, while the channel exceeding the Threshold Level is painted out or the channel not exceeding the Threshold Level is painted out.

Figure 14:
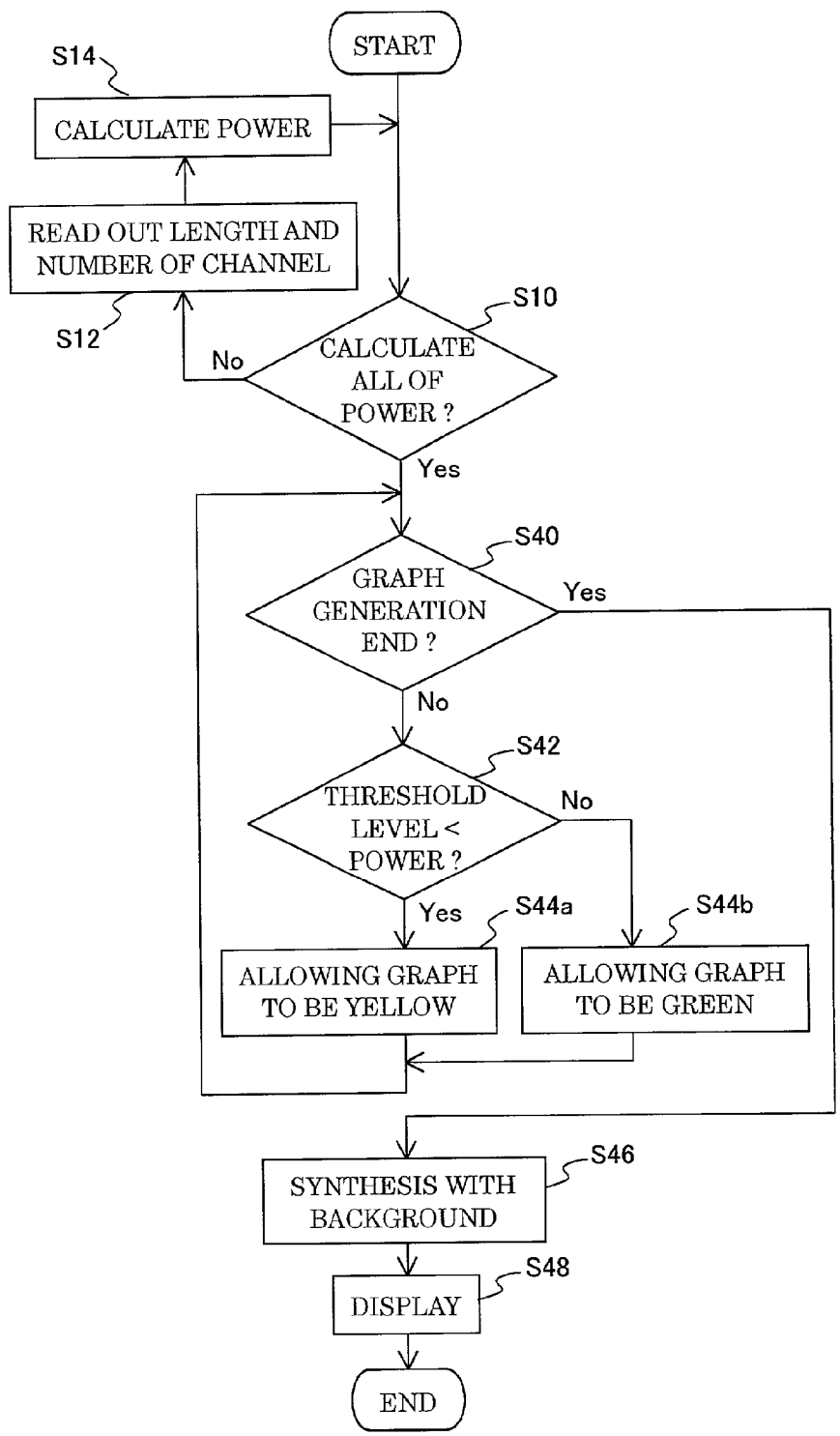
FIG. 14 is a flowchart illustrating operations of the physical quantity display device 1 for displaying physical quantity of the multiple signals according to the third embodiment of the present invention.
Figure 16:
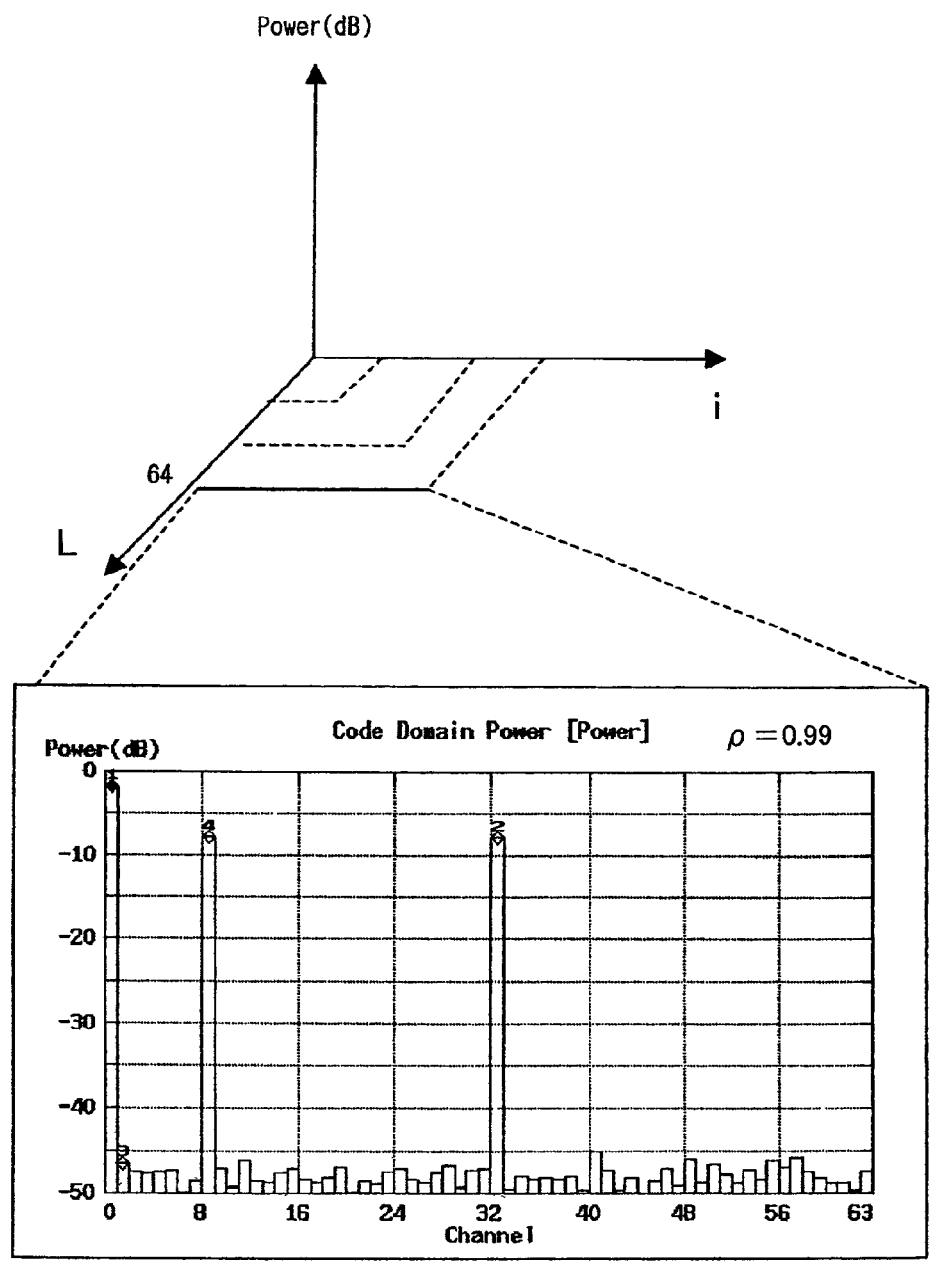
FIG. 16 is a screen display at the time of allowing power of signal in respective channels to be displayed on a display.

Next, operations of the physical quantity display device 1 for displaying physical quantity of the multiple signals according to the third embodiment of the present invention will be described referring to a flowchart of FIG. 14.

Firstly, when the CDMA signals of multi-channel through being subjected to frequency spreading are input to the input terminal 11 (referring to FIG. 2) from the mobile station, the CDMA signals input to the input terminal 11 are converted into intermediate frequency signals by the down converter 12, then the intermediate frequency signals are amplified by the amplifier 13. Further, the amplified intermediate frequency signals are subjected to band limitation by the band pass filter 14 and then the amplified intermediate frequency signals are converted into digital signals by the A/D converter 15. The intermediate frequency signals converted into the digital signals are converted into the measurement signal Z by the orthogonal transformation section 16. Furthermore, the measurement signal Z becomes the bit data and the amplitude in every respective channels through being subjected to despreading depending on the demodulation section 17 on the basis of the spreading code (Walsh Function) which is supplied from the spreading code generation section 18. The ideal signal generation section 19 generates to be output the ideal signal R from the bit data, the amplitude and spreading code in every respective channels.

Accordingly, returning to FIG. 14, judgment is made to execute whether the power calculation section 30 has calculated the power about all of the display object channels stored in the channel storage section 20 (S10). If there exists the display object channel whose power is not calculated yet (S10, No), the power calculation section 30 reads out the spreading code length and the spreading code number from the channel storage section 20 (S12). Further, the power calculation section 30 calculates power of the read out spreading code length and spreading code number (S14). Then, returning to the judgment whether the power has calculated about all of the display object channels (S10).

When the power about all of the display object channels are calculated to be terminated (S10, Yes), judgment is made to execute whether the graph display section 42 generates to be terminated the graph on the basis of calculated value of the power (S40). If the graph display section 42 does not generate to be terminated the graph (S40, No), the graph display section 42 refers to judgment result of the Threshold Level comparison section 70 (S42). If the judgment result is "the power exceeds the Threshold Level" (S42, Yes), the graph display section 42 allows the bar graph to be yellow color (S44a). If the judgment result is "the power does not exceed the Threshold Level" (S42, No), the graph display section 42 allows the bar graph to be green color (S44b). Then, returning to the end judgment of graph generation (S40). Then, operation is made to execute synthesis between the graph with color generated by the graph display section 42 and the background generated by the background display section 44 (S46), before indicating on the display 50 (S48) (referring to FIG. 13).

According to the third embodiment, since the graph display section 42 changes to be displayed display condition such as color and so forth in accordance with size relationship with the Threshold Level in connection with the power of the display object channels, it is possible to distinguish easily whether power of which channel exceeds the Threshold Level and so forth.

Further, when the Code Domain Power is displayed, the power (Estimated $\rho$) and so forth are calculated, and result of this calculation might be displayed at part of display area of the Code Domain Power. The power (Estimated $\rho$) is the sum of the powers whose value exceeds the Threshold Level from among the respective channels of power. Accordingly, although it is important that which channel of power exceeds the Threshold Level among the respective channels of power in such calculation of the power (Estimated $\rho$), there is incomprehensible case that it is difficult to see which channel of power exceeds the Threshold Level. Particularly, in the case that the channel of power is close to the Threshold Level, it is considerably incomprehensible case. According to the third embodiment, it is possible to resolve such problem.

Moreover, aforementioned respective embodiments are capable of being realized in such a way as to be described below. A computer that is provided with, at least, a CPU, a hard disk, and a media-reader, causes media of program capable of realizing respective parts described-above to be stored in the media-reader in order to install the program into the hard disk. Also, in such a method, the aforementioned functions are capable of being realized.

According to the present invention, it is possible to provide devices and so forth making it possible to simplify displays of the Code Domain Power and data pertinent to the Code Domain Power.

What is claimed is:

1. A physical quantity display device for displaying values of a physical quantity of multiple channels with different spreading code lengths while demodulating signals onto which the channels are multiplexed, said device comprising:
    channel storage means for storing therein both the channels to be displayed and the respective spreading code lengths of said channels;
    physical quantity calculation means for calculating the values of the physical quantity of said channels;
    physical quantity display means for displaying the values of the physical quantity of said channels; and
    threshold level comparison means for determining a size relationship between the values of the physical quantity and a predetermined threshold level;
    wherein said physical quantity display means displays the values of the physical quantity of said channels while changing a display condition in accordance with the size relationship between the values of the physical quantity and the threshold level.

2. The physical quantity display device according to claim 1, wherein the Walsh Function is used as the spreading code, and a length of said Walsh Function is the spreading code length.

3. The physical quantity display device according to claim 1, wherein said physical quantity display means displays the values of the physical quantity of said channels while arranging said channels successively on a common axis.

4. The physical quantity display device according to claim 1, wherein said physical quantity display means displays the values of the physical quantity while adding inherent designations to said channels.

5. The physical quantity display device according to claim 1, wherein said physical quantity is a quantity derived from power.

6. The physical quantity display device according to claim 1, further comprising:
    channel selection means for selecting any one of said channels; and
    another physical quantity display means for displaying a value of another physical quantity, which is different from said physical quantity, of the selected channel in a different area within a screen on which the values of said physical quantity of said channels are also displayed.

7. The physical quantity display device according to claim 6, wherein said physical quantity is a quantity derived from power, and said another physical quantity is either error or demodulation data.

8. The physical quantity display device according to claim 1, wherein
    said physical quantity display means displays the value of the physical quantity of each of said channels using a bar, while arranging said channels successively on a common axis at even intervals; and
    the bars used to display the values of the physical quantity of said channels have a common width.

9. A physical quantity display method for displaying values of a physical quantity of multiple channels with different spreading code lengths while demodulating signals onto which the channels are multiplexed, said method comprising the steps of:
    storing both the channels to be displayed and the respective spreading code lengths of said channels;
    calculating the values of the physical quantity of said channels;

displaying the values of the physical quantity of said channels; and determining a size relationship between the values of the physical quantity and a predetermined threshold level;

wherein said displaying step comprises displaying the values of the physical quantity of said channels while changing a display condition in accordance with the size relationship between the values of the physical quantity and the threshold level.

10. A computer-readable medium having a program of instructions for execution by a computer to perform a physical quantity display process for displaying values of a physical quantity of multiple channels with different spreading code lengths while demodulating signals onto which the channels are multiplexed, said physical quantity display process comprising:

a channel storage processing for storing both the channels to be displayed and the respective spreading code lengths of said channels;

a physical quantity calculation processing for calculating the values of the physical quantity of said channels;

a physical quantity display processing for displaying the values of the physical quantity of said channels; and a threshold level comparison processing for determining a size relationship between the values of the physical quantity and a predetermined threshold level;

wherein said physical quantity display processing comprises displaying the values of the physical quantity of said channels while changing a display condition in accordance wit the size relationship between the values of the physical quantity and the threshold level.

11. The method according to claim 9, wherein the Walsh Function is used as the spreading code, and a length of said Walsh Function is the spreading code length.

12. The method according to claim 9, wherein said displaying step comprises displaying the values of the physical quantity of said channels while arranging said channels successively on a common axis.

13. The method according to claim 9, wherein said displaying step comprises displaying the values of the physical quantity while adding inherent designations to said channels.

14. The method according to claim 9, wherein said physical quantity is a quantity derived from power.

15. The method according to claim 9, further comprising selecting any one of said channels; and displaying a value of another physical quantity, which is different from said physical quantity, of the selected channel in a different area within a screen on which the values of said physical quantity of said channels are also displayed.

16. The method according to claim 15, wherein said physical quantity is a quantity derived from power, and said another physical quantity is either error or demodulation data.

17. The method according to claim 9, wherein said displaying step comprises using a bar to display the value of the physical quantity of each of said channels, while arranging said channels successively on a common axis at even intervals; and the bars used to display the values of the physical quantity of said channels have a common width.

18. The computer-readable medium according to claim 10, wherein the Walsh Function is used as the spreading code, and a length of said Walsh Function is the spreading code length.

19. The computer-readable medium according to claim 10, wherein said physical quantity display process further comprises:

a channel selection processing for selecting any one of said channels; and another physical quantity display processing for displaying a value of another physical quantity, which is different from said physical quantity, of the selected channel in a different area within a screen on which the values of said physical quantity of said channels are also displayed.

20. The computer-readable medium according to claim 10, wherein said physical quantity display processing comprises using a bar to display the value of the physical quantity of each of said channels, while arranging said channels successively on a common axis at even intervals; and the bars used to display the values of the physical quantity of said channels have a common width.

* * * * *